(12) United States Patent
Clontz et al.

(10) Patent No.: US 11,310,961 B2
(45) Date of Patent: Apr. 26, 2022

(54) MOWER DECK TRANSPORT LOCK

(71) Applicant: DEERE & COMPANY, Moline, IL (US)

(72) Inventors: Wesley E. Clontz, Holly Springs, NC (US); Ashley Moorehead, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 15 days.

(21) Appl. No.: 16/388,050

(22) Filed: Apr. 18, 2019

(65) Prior Publication Data
US 2020/0329637 A1 Oct. 22, 2020

(51) Int. Cl.
*A01D 34/74* (2006.01)
*A01D 34/82* (2006.01)
*A01D 34/64* (2006.01)

(52) U.S. Cl.
CPC ............. *A01D 34/74* (2013.01); *A01D 34/64* (2013.01); *A01D 34/82* (2013.01)

(58) Field of Classification Search
CPC ........ A01D 34/74; A01D 34/54; A01D 34/82; A01D 34/828; A01D 34/64; A01D 34/66; A01B 63/104
See application file for complete search history.

(56) References Cited

U.S. PATENT DOCUMENTS

| | | | | |
|---|---|---|---|---|
| 2,340,488 A * | 2/1944 | Paradise | ................ | A01D 34/04 56/10.3 |
| 3,040,830 A * | 6/1962 | Lamprecht | ............ | A01D 34/74 56/10.8 |
| 3,508,386 A * | 4/1970 | Hamouz | ................ | A01D 34/64 56/15.9 |
| 3,570,225 A * | 3/1971 | Miskiewicz | ......... | A01D 34/828 56/17.4 |
| 3,654,749 A * | 4/1972 | Ostergren | .............. | A01D 34/63 56/15.8 |
| 3,696,594 A * | 10/1972 | Freimuth | ............... | A01D 34/64 56/15.2 |
| 4,006,580 A * | 2/1977 | Kalleicher | ............. | A01D 34/74 56/17.2 |
| 4,219,069 A * | 8/1980 | Stockman | ............. | F28D 19/047 165/9 |
| 4,577,455 A * | 3/1986 | Amano | ................... | A01D 34/64 56/17.1 |
| 4,664,405 A * | 5/1987 | Bedis | ................... | A01B 63/104 172/298 |

(Continued)

FOREIGN PATENT DOCUMENTS

EP 0047502 A1 * 3/1982 ............. A01D 34/74
EP 1637023 A2 * 3/2006 ........... A01B 45/026
(Continued)

*Primary Examiner* — Alicia Torres
*Assistant Examiner* — Madeline I Runco

(57) ABSTRACT

A mower deck transport lock includes a transport lock plate pivotably mounted to the frame of a zero turn mower for supporting and locking a mower deck in a transport position. A transport lock release knob may be connected to the transport lock plate and releases the mower deck from the transport position so that the mower deck may be supported at any of a plurality of mowing height settings using a dial positioned adjacent the transport lock release knob.

12 Claims, 4 Drawing Sheets

(56) References Cited

U.S. PATENT DOCUMENTS

| | | | | |
|---|---|---|---|---|
| 4,835,952 A * | 6/1989 | McLane | A01D 34/74 | 280/43.13 |
| 5,062,316 A * | 11/1991 | Lykken | G05G 5/06 | 74/529 |
| 5,526,633 A * | 6/1996 | Strong | A01D 34/74 | 280/43.13 |
| 5,784,870 A * | 7/1998 | Seegert | F16H 15/02 | 56/320.1 |
| 5,813,203 A * | 9/1998 | Peter | A01D 34/64 | 56/15.8 |
| 6,122,903 A * | 9/2000 | Hayashi | A01D 34/74 | 56/15.7 |
| 6,427,430 B1 | 8/2002 | Swartzendruber | | |
| 6,494,028 B2 | 12/2002 | Moore | | |
| 6,588,188 B2 | 7/2003 | Dennis | | |
| 6,658,831 B2 * | 12/2003 | Velke | A01D 34/64 | 56/14.7 |
| 6,837,032 B1 * | 1/2005 | Swartzendruber | A01D 34/64 | 56/14.9 |
| 6,868,658 B2 * | 3/2005 | Velke | A01D 34/64 | 56/15.8 |
| 6,935,094 B1 * | 8/2005 | McClure | A01D 89/008 | 56/190 |
| 7,051,499 B2 * | 5/2006 | Goto | A01D 34/661 | 56/14.9 |
| 7,063,177 B1 * | 6/2006 | Crumly | A01D 34/6806 | 180/19.1 |
| 7,197,863 B1 * | 4/2007 | Sugden | A01D 34/66 | 56/15.8 |
| 7,448,191 B2 * | 11/2008 | Elhardt | A01D 34/74 | 56/17.1 |
| 7,540,134 B1 * | 6/2009 | Reich | A01D 34/74 | 56/17.1 |
| 7,562,515 B2 * | 7/2009 | Komorida | A01D 34/74 | 56/14.9 |
| 7,614,207 B2 | 11/2009 | Elhardt et al. | | |
| 7,712,294 B2 * | 5/2010 | Wright | A01D 34/74 | 56/17.1 |
| 7,716,906 B2 | 5/2010 | Swart | | |
| 7,770,370 B2 * | 8/2010 | Komorida | A01D 34/661 | 56/17.1 |
| 8,166,737 B2 * | 5/2012 | Ninomiya | A01D 34/74 | 56/17.2 |
| 8,756,903 B2 * | 6/2014 | Walden | A01D 34/662 | 56/15.8 |
| 8,919,087 B2 * | 12/2014 | Lancaster | A01D 34/74 | 56/17.1 |
| 9,288,940 B2 | 3/2016 | Berglund | | |
| 9,313,953 B2 * | 4/2016 | Borshov | B60T 1/005 | |
| 11,006,574 B1 * | 5/2021 | Nichols | A01D 34/74 | |
| 2013/0074467 A1 * | 3/2013 | Zwieg | A01D 34/82 | 56/17.1 |

FOREIGN PATENT DOCUMENTS

| | | | | |
|---|---|---|---|---|
| EP | 3476195 A1 * | 5/2019 | | A01D 34/662 |
| WO | WO-8505245 A1 * | 12/1985 | | A01B 63/104 |

* cited by examiner

MOWER DECK TRANSPORT LOCK

FIELD OF THE INVENTION

The present invention relates generally to height adjustable mower decks on grass mowing machines, and specifically to a mower deck transport lock.

BACKGROUND OF THE INVENTION

Grass cutting implements such as mower decks are typically carried by self propelled vehicles or lawn tractors having mechanisms allowing adjustment of the decks between a range of heights above ground level. Ordinarily, the range extends between a setting at or below the lowest available mowing height to a setting at or above the highest available mowing height. Adjustment to a position below the mowing height range is frequently preferred for ease in removal of the deck from the vehicle because the deck is that much closer to the ground surface. Adjustment above the mowing height range may permit the deck to clear obstacles encountered while traveling across the ground. This maximum height position may be referred to as the transport position.

Adjustment of the mower deck height may be accomplished by various mechanisms including hand-operated levers and bars positioned in the vicinity of the mowers operator station. The mechanisms require an operator to either push or pull on a lever or bar to adjust the deck height. Pedal actuated mechanisms also are used to adjust cutting deck height relative to the mower frame. Pedal actuated mechanisms may include a handle or other hardware which automatically locks the deck in a given mowing height upon full actuation of the pedal, U.S. Pat. No. 4,120,136 for "Implement Supporting and Lifting Linkage"; U.S. Pat. No. 5,138,825 for "Riding Mower Having a Pedal Operated Height Adjustment Mechanism, Air Assisted Discharge, and Improved Hydrostatic Shift Linkage"; U.S. Pat. No. 5,187,925 for "Mower Deck Lift System Handle Mechanism"; U.S. Pat. No. 5,351,467 for "Height Adjustment Mechanism for Riding Mower Cutting Deck"; U.S. Pat. No. 5,381,648 for "Mower Deck Height Adjustment Mechanism"; U.S. Pat. No. 5,797,252 for "Height of Cut Adjustment Mechanism"; U.S. Pat. No. 5,816,033 for "Riding Lawn Mower Including a Mower Deck Height Control Mechanism"; U.S. Pat. No. 5,946,893 for "Lawn Mower Having Cutter Deck Motion Coupled to Mower Wheel Motion"; U.S. Pat. No. 6,427,430 for "Pedal Lift System for Lawn Tractor Mower Deck"; U.S. Pat. No. 6,494,028 for "Deck Lift Apparatus for Riding Mower"; U.S. Pat. No. 6,588,188 for "Foot Lift Cutter Deck Mower Units" and U.S. Pat. No. 6,837,032 for "Pedal Actuated Height Adjustment Mechanism for a Mower Cutting Deck" provide examples of mower deck lifting mechanisms.

U.S. Pat. Nos. 7,448,191 and 7,614,207 for "Mower Deck Lift System with Transport Lock" discloses a height of cut control knob connected to a height of cut cam having a plurality of mowing height settings, and a height of cut pawl movable to engage or disengage the height of cut cam at each setting. A transport lock crank may be locked in a transport position preventing the pawl from engaging the height of cut cam, or unlocked to allow the pawl to engage the cam. A transport lock indicator integrated into the height of cut control knob is connected to the transport lock crank, and is movable with the transport lock cranks between the transport and unlocked positions.

There is a need for a mower deck transport lock that is easy to operate, and allows the operator use one hand for transport lock release and mowing height of cut settings.

SUMMARY OF THE INVENTION

A mower deck transport lock includes a transport lock release knob slideably mounted adjacent a front edge of a console of a zero turn mower and forwardly of a dial for setting a mowing height of a mower deck. A transport lock plate may be connected to the transport lock release knob. The transport lock plate pivots in response to sliding the transport lock release knob between a transport position engaging a part of a four-bar linkage supporting the mower deck, and a plurality of mowing height positions where the transport lock plate is out of engagement from the four-bar linkage.

DESCRIPTION OF PREFERRED EMBODIMENT

Figure 1:
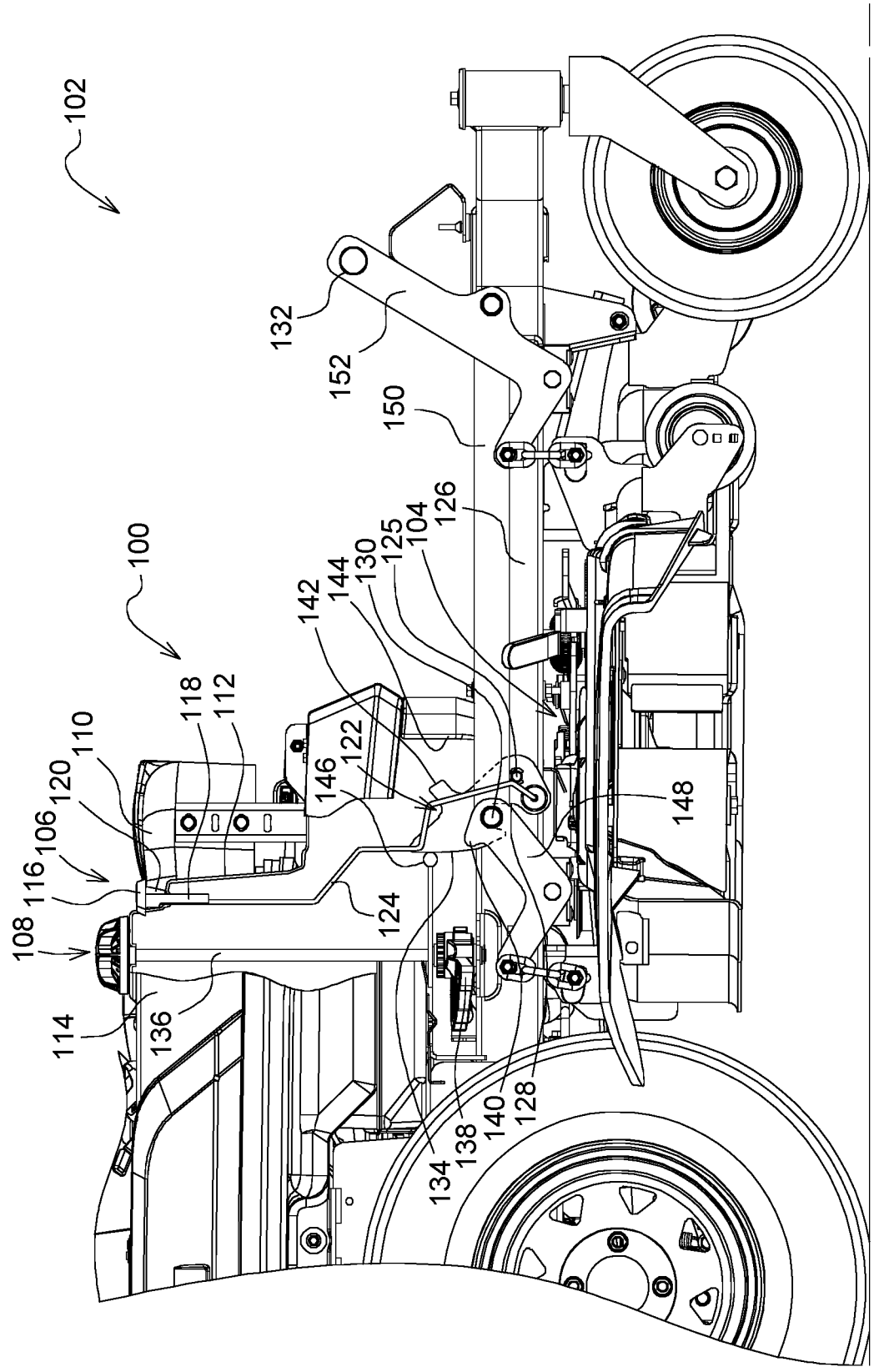
FIG. 1 is a side view, partially in section, of a grass mowing machine having a mower deck transport lock according to a first embodiment, with the mower deck locked in the transport position.

In one embodiment of the invention shown in FIGS. 1-4, mower deck transport lock 100 may be installed on a grass mowing machine 102 which may be a zero turning radius (ZTR) mower having mid-mounted mower deck 104 with a plurality of rotary cutting blades. Alternatively, the transport lock may be installed on a variety of other grass mowing machines including riding lawn tractors. The mower deck transport lock may be used with mower decks that are designed to cut grass at different cutting heights, preferably with a four-bar linkage actuated with a deck lift pedal. However, the mower deck transport lock also may be used with mower decks that are raised and lowered using other devices including electric or hydraulic actuators.

In one embodiment as shown in FIGS. 1-4, mower deck transport lock 100 may include transport lock release knob 106 positioned adjacent height of cut dial 108 alongside operator seat 110. For example, the transport lock release knob may be mounted forwardly of the height of cut dial and adjacent the front edge 112 of console 114. The transport lock release knob may include head 116 attached to the top of stem 118 which enables the transport lock release knob to slide up and down relative to the console. The head of the transport lock release knob may extend forwardly adjacent the front edge of the console to provide a space 120 under the head. The operator may insert his or her fingers under the head to pull up on the transport lock release knob. The head of the transport lock release knob may extend rearwardly toward the height of cut dial, and may be crescent shaped or semi-circular. The transport lock release knob may be configured and positioned so that operators may use one hand to actuate the transport lock release knob and to change mowing height of cut settings with the dial.

In one embodiment, mower deck transport lock 100 may include transport lock release knob 106 connected by a generally vertically oriented connector such as wire form 124 to transport lock plate 122. The transport lock plate may be pivotably mounted on pivot axis 125 to the side of frame member 126 of the ZTR mower. The operator may pull up the transport lock release knob to pivot the transport lock plate, as will be described in more detail below.

Figure 3:
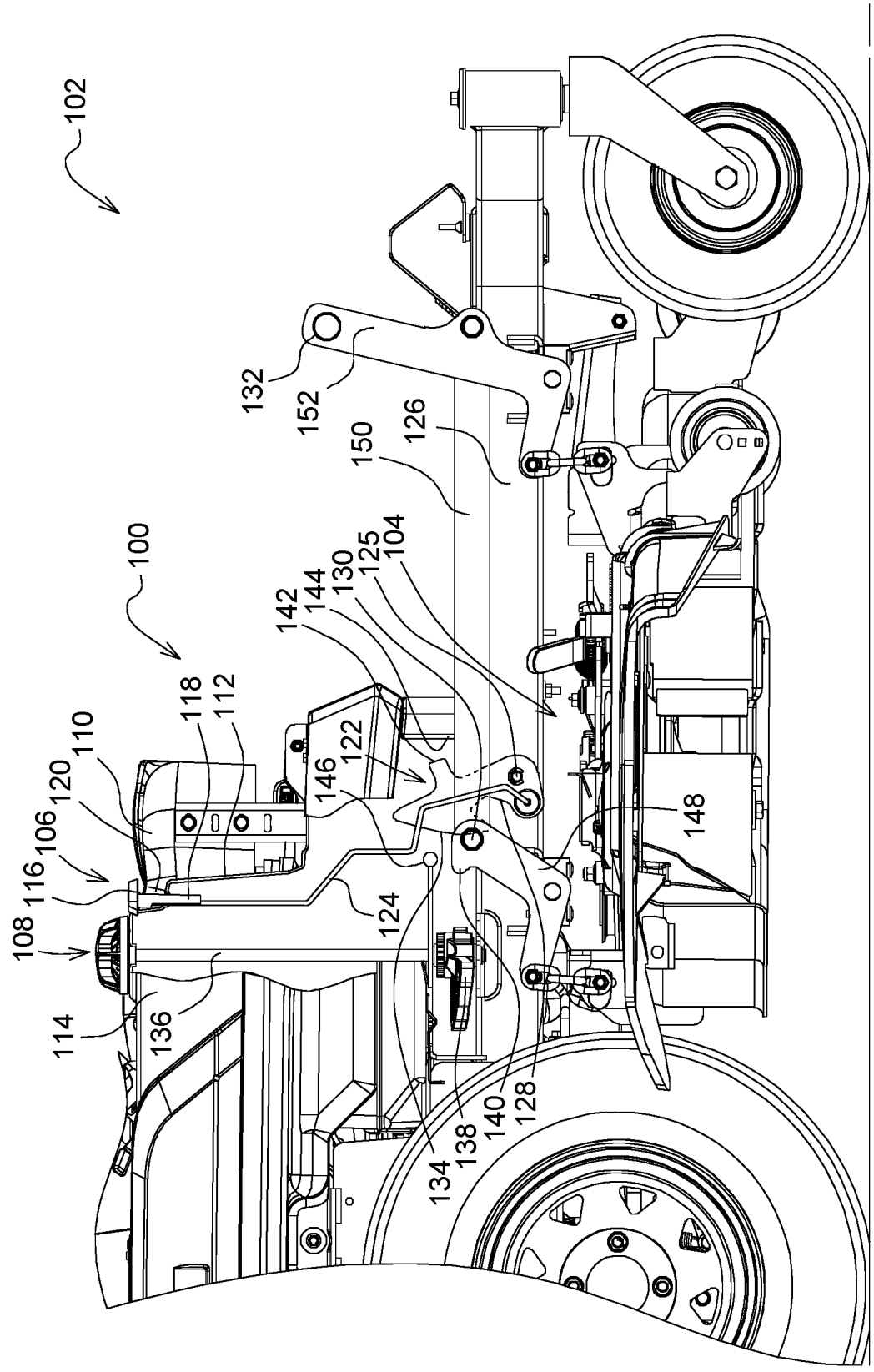
FIG. 3 is a side view, partially in section, of a grass mowing machine having a mower deck transport lock according to a first embodiment, with the mower deck at a medium or high mowing height setting.

In one embodiment, mower deck transport lock 100 may include transport lock plate 122 which may support and lock the mower deck in the transport position. FIG. 1 shows the mower deck locked in the transport position. The operator may lock the deck in the transport position by pressing all the way down on deck lift pedal 132 to fully raise the mower deck. As the operator raises the mower deck, rear lift shaft pin 130 may contact the rear edge 134 of the transport lock plate as shown in FIG. 3, and ride on the rear edge until the rear lift shaft pin moves into slot 128. In the transport position, the transport lock plate engages and supports the four-bar linkage supporting the mower deck in the transport position. Alternatively, instead of the rear lift shaft pin, another part of the four-bar linkage may move into slot 128 or engage the transport lock plate to support and lock the mower deck in the transport position. The operator may raise the mower deck and lock the four-bar linkage and mower deck in the transport position without using the transport lock release knob.

Figure 2:
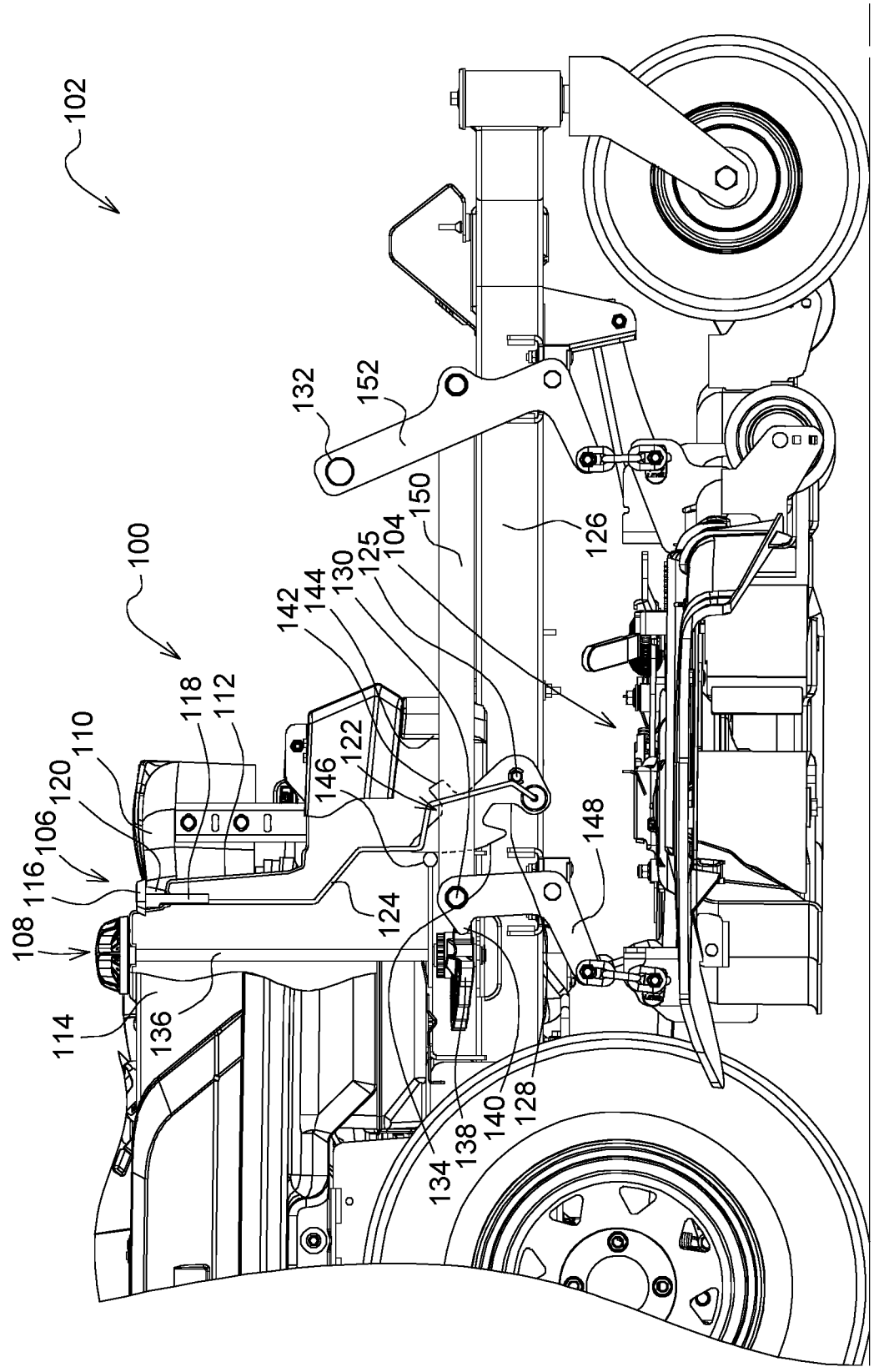
FIG. 2 is a side view, partially in section, of a grass mowing machine having a mower deck transport lock according to a first embodiment, with the mower deck at a low mowing height setting.
Figure 4:
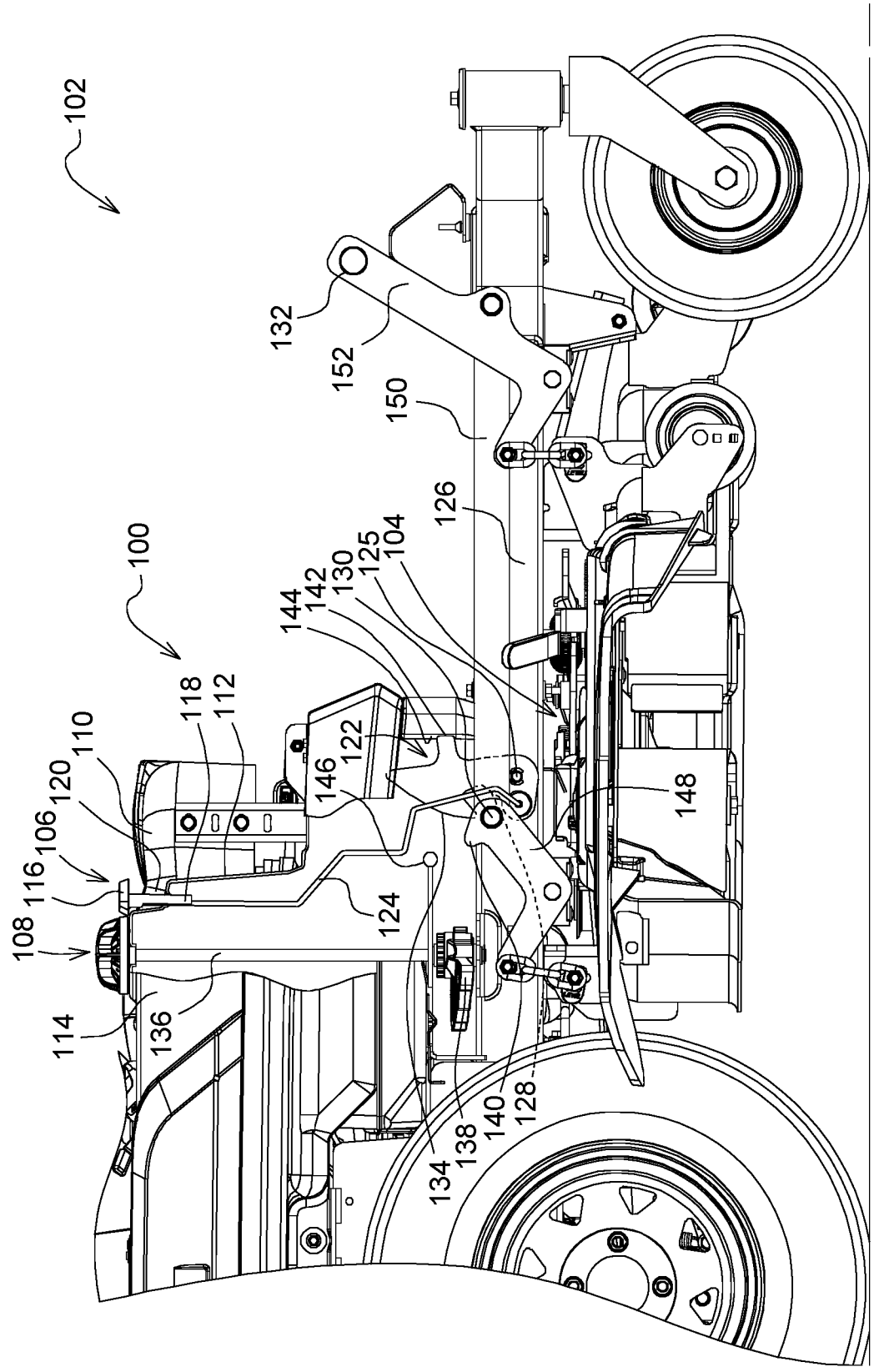
FIG. 4 is a side view, partially in section, of a grass mowing machine having a mower deck transport lock according to a first embodiment, with the mower deck unlocked from the transport position.

In one embodiment, mower deck transport lock 100 may include transport lock release knob, along with the deck lift pedal, to unlock the mower deck from the transport position. FIG. 4 shows the mower deck unlocked from the transport position. The operator may unlock the deck from the transport position by pulling up transport lock release knob 106 while pressing all the way down on deck lift pedal 132. This pivots the transport lock plate clockwise, until the rear lift shaft pin is out of slot 128. Stop 142 on the transport lock plate may contact shoulder 144 to limit how far the transport lock plate may pivot in the clockwise direction as shown in FIG. 4. The operator then may release the transport lock release knob, and also may release the deck lift pedal to allow the deck to descend to the mowing height setting specified by the height of cut dial. For example, FIG. 2 shows the mower deck at a low mowing height setting, where the rear edge 134 of the transport lock plate may contact stop 146 as it pivots in the counterclockwise direction. FIG. 3 shows the mower deck at a medium or high mowing height setting, where the rear lift shaft pin may contact the rear edge 134 of the transport lock plate, which may have a curved surface. From a medium or high mowing height setting, the rear lift shaft pin may continue riding on the rear edge of the transport lock plate until the mower deck is raised to the transport position shown in FIG. 1. The rear lift shaft pin may ride on the rear edge of the transport lock plate, but the transport lock plate may not engage or support the four-bar linkage in the mowing position.

In one embodiment, mower deck transport lock 100 may be used along with height of cut dial 108 connected to shaft 136 that rotates cam 138 to any of a plurality of height of cut settings, such as the low mowing height setting of FIG. 2 and the medium or high mowing height setting shown in FIG. 3. At each mowing height setting, pawl 140 on rear lift shaft arm 148 may extend rearwardly into contact or engagement with the cam, supporting the four-bar linkage and mower deck. The four-bar linkage may include lift shaft weldment 150 extending between rear lift shaft arm 148 and front lift shaft arm 152 with deck lift pedal 132, all of which may pivot together to raise and lower the mower deck.

Having described the preferred embodiment, it will become apparent that various modifications can be made without departing from the scope of the invention as defined in the accompanying claims.

The invention claimed is:

1. A mower deck transport lock, comprising:
   a transport lock release knob slideably mounted adjacent a front edge of a console of a zero turn mower and forwardly of a dial for setting a mowing height of a mower deck by turning a cam; and
   a transport lock plate connected to the transport lock release knob, the transport lock plate pivoting in response to pulling the transport lock release knob up to disengage the transport lock plate from supporting the mower deck in a transport position above the mowing height; and
   a lift shaft arm engaging the cam at the mowing height set by the dial when the transport lock release knob is released.

2. The mower deck transport lock of claim 1 further comprising a rear lift shaft pin that engages the transport lock plate in the transport position.

3. The mower deck transport lock of claim 1 further comprising a space for manually pulling up the transport lock release knob at the front edge of the console.

4. The mower deck transport lock of claim 1 further comprising a first stop and a second stop for limiting pivoting of the transport lock plate.

5. A mower deck transport lock, comprising:
   a transport lock plate pivotably mounted to the frame of a zero turn mower for engaging a mower deck in a transport position above a plurality of height of cut positions by fully depressing a foot pedal to raise the mower deck; and
   a transport lock release knob connected to the transport lock plate for releasing the mower deck from the transport position by depressing the foot pedal and pulling up the transport lock release knob,
   a lift shaft arm that engages a cam when the mower deck is released from the transport position, the cam supporting the mower deck at any of the plurality of height of cut positions using a dial that turns the cam and is positioned adjacent the transport lock release knob.

6. The mower deck transport lock of claim 5 further comprising a wire form connecting the transport lock plate to the transport lock release knob.

7. The mower deck transport lock of claim 5 further comprising the foot pedal to raise the mower deck from any of the mowing height settings to the transport position.

8. The mower deck transport lock of claim 5 wherein the transport lock release knob extends forwardly from a front end of a console adjacent an operator seat.

9. A mower deck transport lock, comprising:
   a transport lock release knob connected by a wire form to a pivoting transport lock plate that engages a rear lift shaft arm of a four bar linkage to support a mower deck in a transport position when the mower deck is fully raised;
   the transport lock release knob slides up to disengage the transport lock plate from the rear lift shaft arm which pivots into contact with a rotating cam to support the mower deck at any of a plurality of mowing height settings.

10. The mower deck transport lock of claim 9 wherein the transport lock plate includes a rear edge that at least part of the four bar linkage rides on while the mower deck is raised from a mowing height setting to the transport position.

11. The mower deck transport lock of claim 9 where the transport lock release knob is positioned forwardly of a deck height dial connected to the rotating cam.

12. The mower deck transport lock of claim 9 wherein the transport lock plate includes a slot engaged by part of the four-bar linkage in the transport position.

* * * * *